(12) United States Patent
Yahata et al.

(10) Patent No.: US 6,202,813 B1
(45) Date of Patent: *Mar. 20, 2001

(54) PAWL NOISE DAMPENING MECHANISM FOR A BICYCLE FREEWHEEL

(75) Inventors: Yasuhiro Yahata; Koshi Tabe, both of Sakai (JP)

(73) Assignee: Shimano, Inc., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/789,435

(22) Filed: Jan. 27, 1997

(30) Foreign Application Priority Data

Feb. 2, 1996 (JP) .................................................. 8-040424

(51) Int. Cl.[7] ..................................................... F16D 41/30
(52) U.S. Cl. .................................. 192/64; 192/46; 74/576
(58) Field of Search ......................... 192/46, 64; 74/576

(56) References Cited

U.S. PATENT DOCUMENTS

| 1,883,966 | * 10/1932 | Krause | 74/576 |
|---|---|---|---|
| 2,844,050 | 7/1958 | Brendel | 74/750 |
| 2,988,186 | * 6/1961 | Dotter | 192/64 X |
| 4,548,304 | * 10/1985 | Nagata | 192/46 |
| 4,674,617 | * 6/1987 | Nagano | 192/64 X |
| 4,711,331 | 12/1987 | Hoffman | 192/46 |
| 5,460,254 | 10/1995 | Huang | 192/64 |

FOREIGN PATENT DOCUMENTS

| 2152157 | 7/1985 | (GB) . | |
| 56-90127 | * 7/1981 | (JP) | 192/46 |
| 56-164232 | * 12/1981 | (JP) | 192/46 |

* cited by examiner

Primary Examiner—Richard M. Lorence
(74) Attorney, Agent, or Firm—James A. Deland

(57) ABSTRACT

A ratchet mechanism for a bicycle hub includes a first hub member and a second hub member, wherein the first hub member and the second hub member are rotatable relative to each other. A pawl is supported by the first hub member, a ratchet tooth is supported by the second hub member, and a biasing mechanism is provided for biasing the pawl toward the ratchet tooth. A pawl control mechanism is responsive to relative rotation of the first hub member and the second hub member for allowing the pawl to contact the ratchet tooth when the first hub member and the second hub member rotate relative to each other in one direction and for preventing the pawl from contacting the ratchet tooth when the first hub member and the second hub member rotate relative to each other in an opposite direction.

19 Claims, 6 Drawing Sheets

PAWL NOISE DAMPENING MECHANISM FOR A BICYCLE FREEWHEEL

BACKGROUND OF THE INVENTION

The present invention is directed to bicycle freewheels and, more particularly, to a pawl noise dampening mechanism for a bicycle freewheel.

The hub of the drive-side wheel (usually the rear wheel) of a bicycle is sometimes provided with an integrated or separate freewheel. The freewheel is usually equipped with a one-way clutch mechanism so that only unidirectional rotational force is transmitted to the bicycle wheel. One-way clutch mechanisms having various structures are known. One known example is a ratchet mechanism in which engagement between pawls and ratchet teeth is employed. When the chain is driven by the pedals and a cog is rotatably driven, the ratchet mechanism transmits the torque from the ratchet teeth to the pawls and rotatably drives an inner component. The pawls are actuated by pawl springs in such a way as to ensure constant engagement with the ratchet teeth. The ratchet mechanism must possess extremely high strength and shock resistance because considerable torque and impact forces are transmitted from the ratchet teeth to the pawls.

When the pedals are stopped or rotated backward, the inner component of the freewheel rotates together with the wheel, creating a rotational movement in relation to the ratchet teeth. Because the inner component has pawls, the pawls and the ratchet teeth move relative to each other. Since the pawls are constantly actuated and pressed against the tooth surfaces of the ratchet teeth by pawl springs, the pawls chatter against the teeth surfaces of the ratchet teeth when performing a rocking movement in conformity with the peaks and valleys of the ratchet teeth. The noise generated by such a ratchet mechanism is unpleasant for the cyclist, and the friction between the pawls and the tooth surfaces of the ratchet teeth wastes energy. The result is that this type of friction wears out the pawls and the tooth surfaces of the ratchet teeth, thus shortening freewheel life.

SUMMARY OF THE INVENTION

The present invention is directed to a bicycle freewheel wherein the engagement between the pawls and ratchet teeth is silent when the bicycle pedals are stopped or rotated backward, and wherein the wear of the pawls and ratchet teeth is reduced. In one embodiment of the present invention, a ratchet mechanism for a bicycle hub includes a first hub member and a second hub member, wherein the first hub member and the second hub member are rotatable relative to each other. A pawl is supported by the first hub member, a ratchet tooth is supported by the second hub member, and a biasing mechanism is provided for biasing the pawl toward the ratchet tooth. A pawl control mechanism is responsive to relative rotation of the first hub member and the second hub member for allowing the pawl to contact the ratchet tooth when the first hub member and the second hub member rotate relative to each other in one direction and for preventing the pawl from contacting the ratchet tooth when the first hub member and the second hub member rotate relative to each other in an opposite direction.

The ratchet mechanism may be incorporated in a hub wherein both the first hub member and the second hub member are coaxially and rotatably supported on a hub axle. A plurality of pawls and ratchet teeth may be provided wherein the pawl control mechanism allows at least one of the pawls to contact a corresponding ratchet tooth when the first hub member and the second hub member rotate in the one direction. On the other hand, the pawl control mechanism prevents the pawls from contacting the ratchet teeth when the first hub member and the second hub member rotate relative to each other in the opposite direction. In a more specific embodiment, the first hub member may be formed as an inner cylindrical member and the second hub member may be formed as an outer cylindrical member coaxially supported radially outwardly of the inner cylindrical member. Alternatively, a hub shell may be coaxially and rotatably supported on the hub axle, wherein the hub shell includes an annular component which forms the second hub member. In this case the second hub member is coaxially supported radially outwardly of the first hub member.

In any event, the plurality of pawls may be supported to an outer surface of the first hub member, and the plurality of ratchet teeth may be supported to an inner surface of the second hub member. The pawl control mechanism may include an annular cage and a clutch. The annular cage may include a plurality of pawl pressure components, wherein each pawl pressure component is adapted to contact a corresponding pawl. The clutch may coupled to the cage and to one of the first hub member and second hub member so that the pawl pressure components do not interfere with the normal operation of the pawls when the first hub member and the second hub member relatively rotate in the one direction. However, the plurality of pawl pressure components retract their corresponding pawls when the first hub member and the second hub member relatively rotate in the opposite direction.

In a more specific embodiment, the clutch may be formed as a circular slide spring having an end coupled to the cage and an outer peripheral surface in contact with the inner surface of the second hub member. When the first and second hub members relatively rotate in the one direction, the slide spring engages the second hub member for moving the pawl pressure components away from engagement with the pawls, thus allowing the pawls to contact the ratchet teeth. On the other hand, when the first and second hub members relatively rotate in the opposite direction, the slide spring engages the second hub member for moving the pawl pressure components to retract the pawls, thus preventing the pawls from contacting the ratchet teeth. This results in silent operation and decreased wear of the ratchet mechanism.

BRIEF DESCRIPTION OF THE DRAWINGS

FIG. 2b is a right-side view of FIG. 2a;

FIG. 2c is a left-side view of FIG. 2a;

FIG. 5b is a view taken along line Vb—Vb in FIG. 5a;

DETAILED DESCRIPTION OF THE EMBODIMENTS

Figure 1:
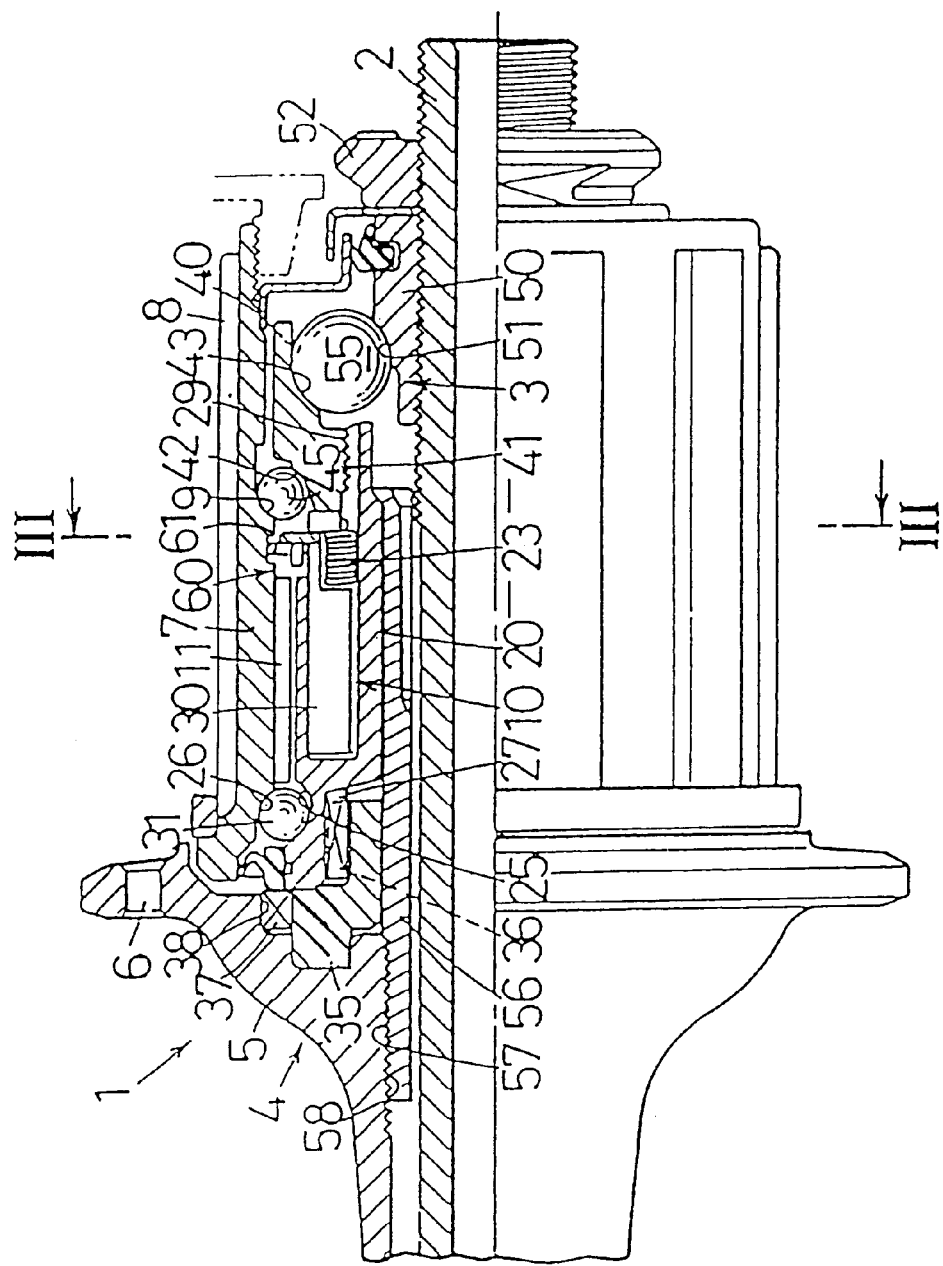
FIG. 1 is a partial cross-sectional view of a bicycle hub which incorporates a particular embodiment of a ratchet mechanism including a noise-dampening mechanism according to the present invention.

FIGS. 1 through 5 illustrate a bicycle hub which incorporates a particular embodiment of a ratchet mechanism including a noise-dampening mechanism according to the present invention. FIG. 1, which is a partial cross section of the outer ring of a rear hub 1, depicts only a cross section of the portion above the center line. The rear hub 1 is disposed about a horizontally extending hub axle 2. A hub shell 4 is rotatably supported by means of a left bearing (not shown; positioned on the left side of the drawing) and a right bearing 3 in such a way that rotation about the hub axle 2 is permitted.

The hub shell 4 is equipped with a left-side flange (not shown) and a right-side flange 5. The hub shell 4 is a common standardized component of ordinary shape. The left-side flange and right-side flange 5 are provided with axial spoke insertion holes 6 for inserting the curved portions at the end of spokes (not shown) that extend in radial directions away from the hub axle 2.

An outer ring 7 (also referred to as "the outer") has a roughly cylindrical shape, and a spline 8 is formed along the outer periphery of the outer ring 7. A cassette-type multiple sprocket freewheel (not shown) is inserted into and fixed to the spline 8. Ratchet teeth 11 that form a ratchet mechanism 10 are formed along the inner peripheral surface of the interior opening of the outer ring 7. In this embodiment, there are 31 ratchet teeth 11. In the interior opening of the outer ring 7, an inner cylinder 20 (also referred to simply as "an inner component") is inserted and disposed coaxially with the hub axle 2 and the outer ring 7. The inner cylinder 20 is designed to hold the pawl 30.

Figure 2A:
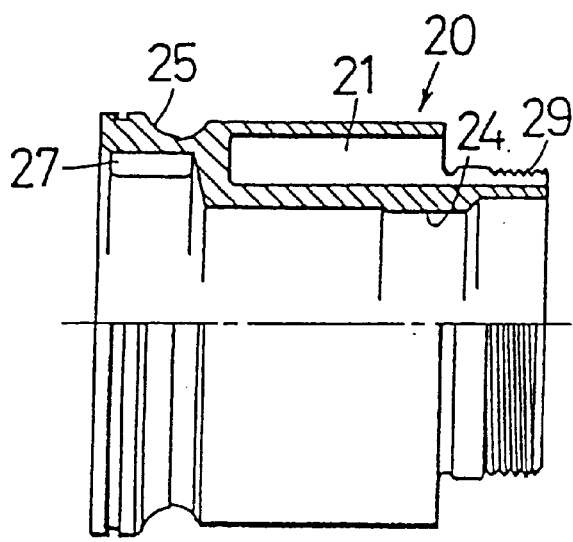
FIG. 2a is a partial cross sectional view of an inner cylinder shown in FIG. 1.
Figure 2B:
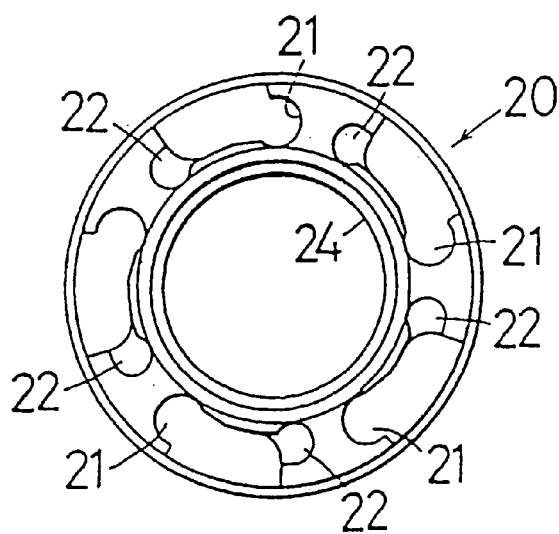
Figure 2C:
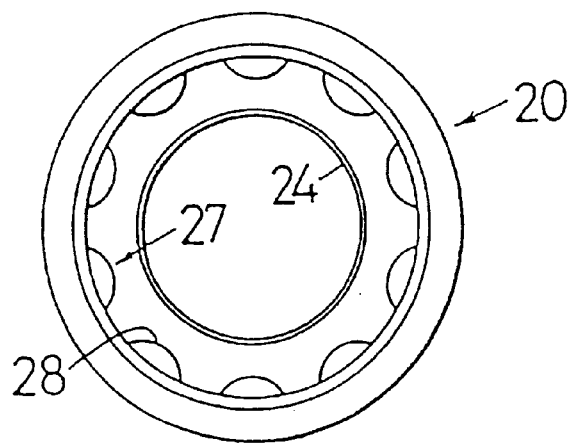

FIGS. 2a, 2b, and 2c show the structure of the inner cylinder 20. FIG. 2a is a cross section, FIG. 2b a right-side view of FIG. 2a, and FIG. 2c a left-side view of FIG. 2a. As shown in those Figures, five pawl support holes 21 are disposed at regular angular intervals along the outer periphery of the inner cylinder 20, and the center axes of the pawl support holes 21 are disposed parallel to the center axis of the inner cylinder 20. The pawl support holes 21, which are intended to swingably support one end of the pawls 30, are partially open round holes with an angle of about 240 degrees. The depth of the pawl support holes 21, that is, the axial length of the pawl support holes 21, is roughly equal to the length of the pawls 30.

Spring support holes 22 are formed opposite the pawl support holes 21 in pairs with pawl support holes 21, wherein the center axes of the spring support holes 22 are disposed parallel to the center axes of the pawl support holes 21 and the inner cylinder 20. The spring support holes 22 are intended to accommodate and support pawl springs 23. The pawl springs 23 are intended to actuate the tips of the pawls 30 in such a way that they engage the ratchet teeth 11. In this embodiment, the pawl springs 23 are torsion coil springs in which one end engages one end of the pawls 30, and the other end comes into contact with the outer peripheral surface of the inner cylinder 20 to actuate the pawls 30 as described above. For this reason, one end of the pawls 30 is inserted into and swingably supported by the pawl support holes 21, and is actuated by the pawl springs 23 to ensure unidirectional rocking.

A support hole 24 is formed in the center of the inner cylinder 20. The support hole 24 is a through hole for inserting the body fixing bolt 56. An external thread 57 is formed on the tip of the body fixing bolt 56, and the inner cylinder 20 is integrally fixed to the hub shell 4 by screwing the external thread 57 into an internal thread 58 formed in the hub shell 4.

A ball rolling surface 25 with a semicircular cross section is formed along the outer periphery of one end of the inner cylinder 20. A ball rolling surface 26 is also formed on the peripheral surface of the interior opening of the outer ring 7. Steel balls 31, which are interposed between the ball rolling surface 26 of the outer ring 7 and the ball rolling surface 25 of the inner cylinder 20, roll on the ball rolling surface 25 and the ball rolling surface 26, rotatably 'supporting the outer ring 7 on the inner cylinder 20.

Internal serrations 27 are formed at one end of the inner cylinder 20. The internal serrations 27 are divided into ten equal sections, with the cross-sectional shape consisting of ten semicircular protrusions 28. The internal serrations 27 are intended to connect the inner cylinder 20 to a serration main body 35. Serration main body 35 is interposed between the inner cylinder 20 and the hub shell 4. The serration main body 35 is a joint for transmitting the rotational torque from the chain to the hub shell 4 via the outer ring 7, the ratchet mechanism 10, and the inner cylinder 20. External serrations 36 for engaging the internal serrations 27 of the inner cylinder 20 are formed along the outer periphery of one end of the serration main body 35, wherein the peaks and valleys of the external serrations 36 are complementary to the peaks and valleys of the internal serrations 27, wherein the external serrations 37 are formed along the outer periphery of the other end of the serration main body 35. The external serrations 37 of the serration main body 35 engage internal serrations 38 formed in the hub shell 4. The shapes of the external serration 37 and internal serration 38 are similar to those of the aforementioned external serrations 36 and the aforementioned internal serrations 27, and are therefore not shown. The rotational torque of the freewheel is ultimately transmitted to the hub shell 4 via the outer ring 7, the ratchet mechanism 10, the inner cylinder 20, the internal serrations 27 of the inner cylinder 20, the external serrations 36 and external serrations 37 of the serration main body 35, and the internal serrations 38 of the hub shell 4.

A thread 29 is formed along the outer periphery of the other end of the inner cylinder 20, and an internal thread 41 of a screw cup 40 is screwed onto the thread 29 and fixed to the inner cylinder 20. The screw cup 40 is therefore integrally fixed to the inner cylinder 20. A rolling surface 42 is formed on the outer peripheral surface of the screw cup 40, and a rolling surface 43 is formed on the inner peripheral surface of the interior opening thereof. Steel balls 45 are interposed between the rolling surface 42 of the screw cup 40 and a rolling surface 9 formed on the inner peripheral surface of the interior opening of the outer ring 7.

The outer ring 7 and the inner cylinder 20 can rotate in relation to each other. A cone 50 is screwed into the threaded portion of the hub axle 2. The cone 50 is also fixed to the hub axle 2 with a lock nut 52. A rolling surface 51 is formed along the outer peripheral surface of the cone 50. Steel balls 55, which are interposed between the rolling surface 43 of the screw cup 40 and the rolling surface 51 of the cone 50, roll on the rolling surface 43 and the rolling surface 51.

The inner cylinder 20, serration main body 35, hub shell 4, and body fixing bolt 56 are therefore rotatably integrated on the hub axle 2. As is evident from the description of the above structure, rotating the threaded body fixing bolt 56 makes it possible to fix the outer ring 7, inner cylinder 20 and serration main body 35 to the hub shell 4 or to detach them from the hub shell 4 as an integral unit when the cone 50 and the steel balls 55 have been removed. The resulting advantage is that these components can be easily replaced.

When the outer ring 7 is stopped or rotated backward in the ratchet mechanism 10, the inner cylinder 20 is rotatably driven by means of the hub shell 4, so the pawls 30 rotate in relation to the ratchet teeth 11, and pawl noise is generated by the peaks and valleys on the tooth surfaces of the ratchet teeth 11, as described above. The pawl noise dampening mechanism 60 is designed to prevent such pawl noise.

A cage hole 61 whose diameter is somewhat greater than the size of the ratchet teeth 11 is formed in the inner peripheral surface of the interior opening of the outer ring 7. The cage hole 61 is disposed in the vicinity of the steel balls 45 along the outer periphery of one end of the pawls 30. A pawl noise dampening mechanism 60 for dampening pawl noise is inserted into the cage hole 61.

Figure 5A:
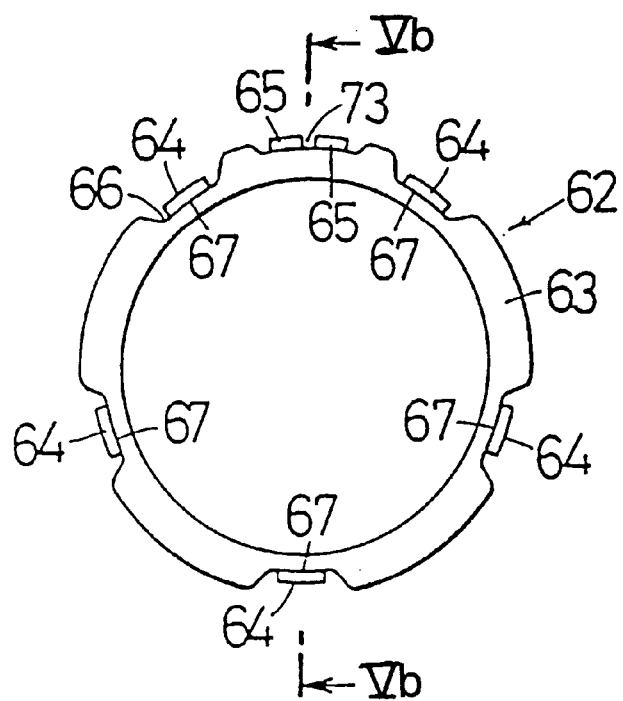
FIG. 5a is a front view of a particular embodiment of a cage used in the noise damping mechanism shown in FIG. 1.
Figure 5B:
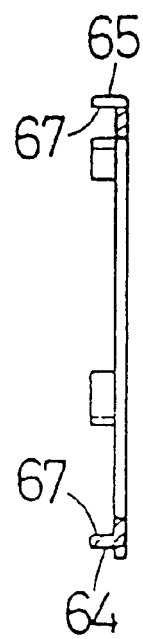

FIGS. 5a and 5b show a cage 62 that constitutes the pawl noise dampening mechanism 60. The cage 62 has an annular shape and is made of sheet metal. The cage 62 comprises an annular disk component 63, pawl pressure components 64, a slide spring engagement component 65, and the like. The annular disk component 63 is a portion that forms the main body of the cage 62, and depressions 66 shaped as radial slots are formed at five locations along the outer periphery thereof. The pawl pressure component 64 in each of the depressions 66 is connected to the annular disk component 63 and is bent at 90 degrees.

When the cage 62 is rotated, the inner peripheral surfaces 67 of the pawl pressure components 64 come into contact with the outer peripheral surfaces of the pawls 30, and the tips of the pawls 30 are turned against the action of the pawl springs 23, that is, toward the center in the radial direction. The pawls 30 will therefore come into contact with the tooth surfaces of the ratchet teeth 11. The cage 62 is driven by a slide spring 70 in which friction in one direction of rotation is greater than in the other direction of rotation.

The slide spring 70 is made of steel wire and is roughly a full circle. One end of the slide spring 70 is formed into an engagement component 71 bent at about 90 degrees in the radial direction, whereas the other end 72 is free. The engagement component 71 is inserted into a slit 73 between two slide spring engagement components 65. The outer peripheral surface of the slide spring 70 is pressed against the inner peripheral surface of the cage hole 61 ofthe outer ring 7.

The operation of this embodiment will now be described.

The pedaling force of the cyclist drives the left and right crank arms. The drive action is transmitted from the chainwheel via the chain to the sprocket selected by the shifting operation of a multiple sprocket freewheel. This drive action creates a rotational drive force in the outer ring 7, which is rotated simultaneously with the chainwheel. This rotational drive force is applied to ratchet teeth 11, which are rotatably driven, and the pawls 30 and the ratchet teeth 11 are rotated in relation to each other in the direction of engagement. This relative rotation causes one of a plurality of the pawls 30 to interlock with and engage the single ratchet tooth 11 that is in the same phase. This engagement allows the outer ring 7 to receive the rotational drive force, and the hub shell 4 to be rotatably driven via the inner cylinder 20 and the serration main body 35.

Figure 3:
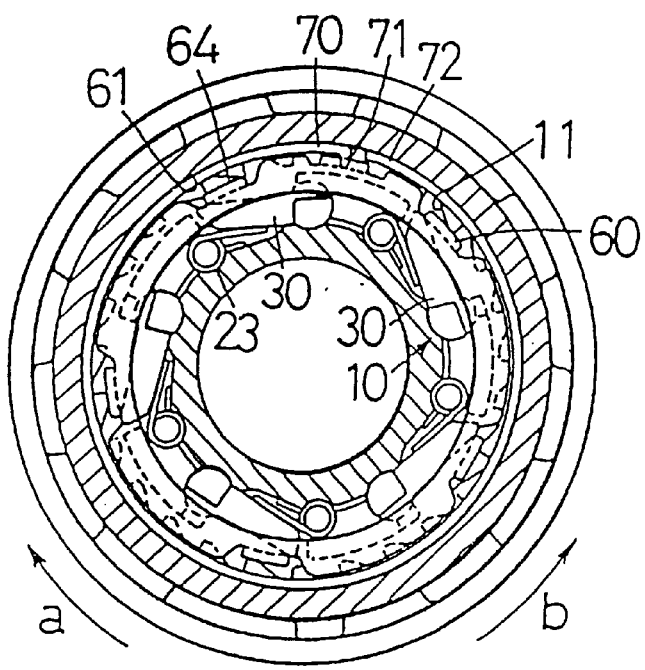
FIG. 3 is a view taken along line III—III in FIG. 1 showing the noise dampening mechanism in an on state.
Figure 4:
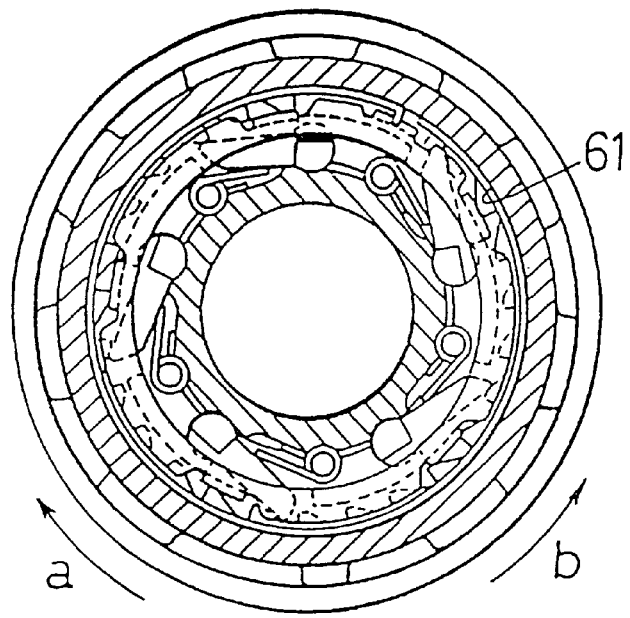
FIG. 4 is a view taken along line III—III in FIG. 1 showing the noise dampening mechanism in an off state.

The above description concerns the operation of the ratchet mechanism 10 that occurs when the bicycle is propelled by pedaling. The operation of the pawl noise dampening mechanism 60 will now be described in detail. For the sake of simplicity, it is assumed that the inner cylinder 20 is stationary. When the pedals and the chain are driven and the outer ring 7 is rotated in the direction of arrow (a) in FIGS. 3 and 4, the inner peripheral surface of the cage hole 61 comes into contact with the outer peripheral surface of the slide spring 70, so the frictional force acts in the tangential direction on the outer peripheral surface of the slide spring 70. This action moves aside one end 72 of the slide spring 70. As a result, the outer ring 7 and the slide spring 70 are rotated as an integral whole. As this integral rotation proceeds, the pawl pressure components 64 of the cage 62 separate from the outer periphery of the pawls 30 and assume a retracted state, as shown in FIG. 4. Of the five pawls 30 that have different phases, one specific pawl 30 interlocks with the ratchet tooth 11 that has the corresponding angular phase.

When the outer ring 7 is rotated backward in the direction of arrow (b), the inner peripheral surface of the cage hole 61 of the outer ring 7 comes into contact with the outer periphery of the slide spring 70, so the resulting frictional force causes the slide spring 70 and the outer ring 7 to rotate as an integral whole under the action of the frictional force alone. This frictional force is weaker than the frictional force generated during the aforementioned driving action. The rotation of the outer ring 7 in the direction of arrow (b) causes the pawl pressure components 64 of the cage hole 61 to press against the outer periphery of the tips of the pawls 30 in opposition to the action of the pawl springs 23, disengaging the pawls 30 and the ratchet teeth 11. In addition, when the outer ring 7 is rotatably driven, the inner peripheral surface of the cage hole 61 and the outer peripheral surface of the slide spring 70 slidably move in relation to each other. The pawl pressure components 64 keep the pawls 30 in a pressed state and prevent the pawls 30 and the tooth surfaces of the ratchet teeth 11 from coming into contact with each other. No pawl noise is thus generated (this state is shown in FIG. 3).

Figure 6:
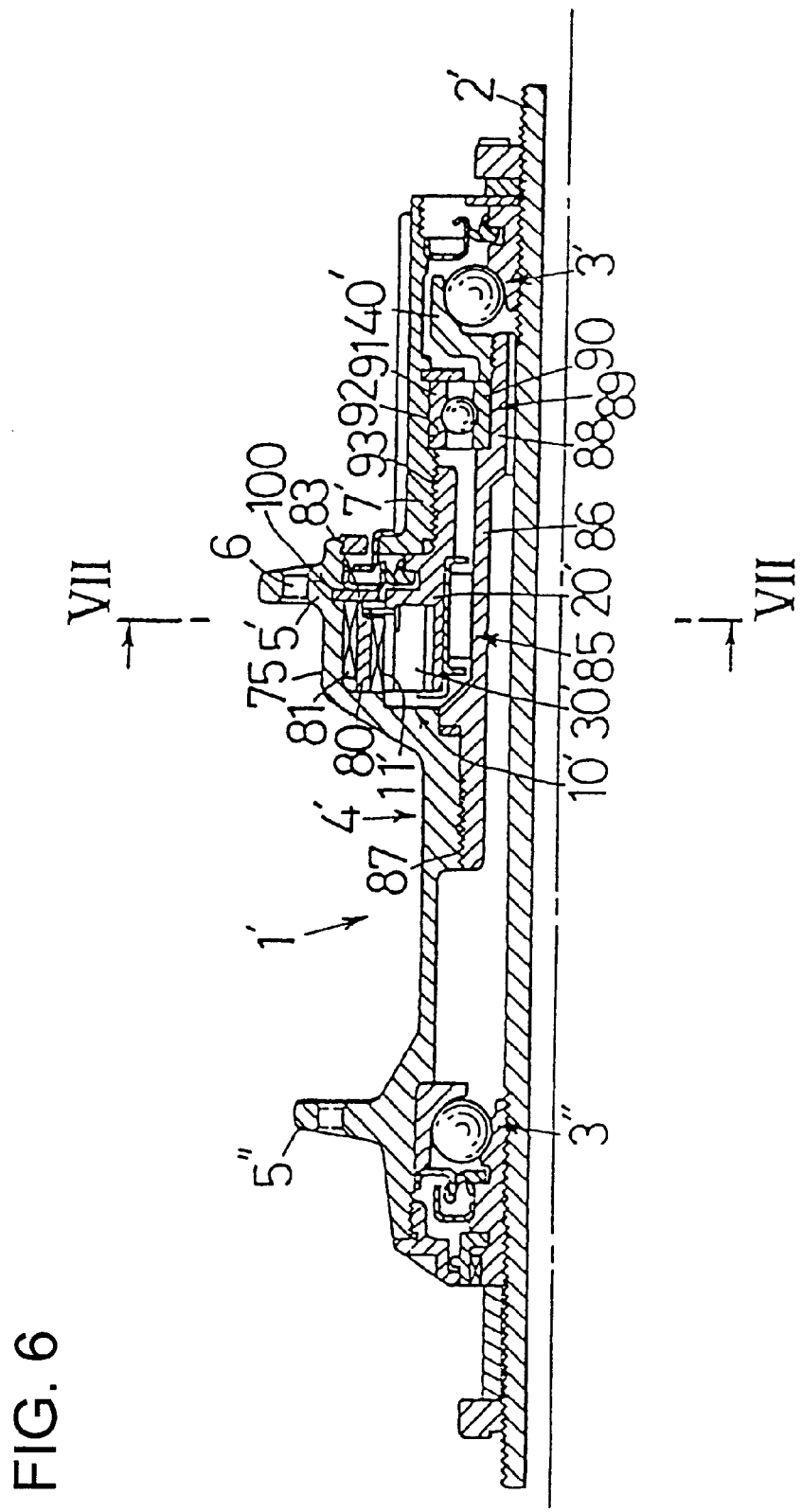
FIG. 6 is a partial cross-sectional view of a bicycle hub which incorporates an alternative embodiment of a ratchet mechanism including a noise-dampening mechanism according to the present invention.
Figure 7:
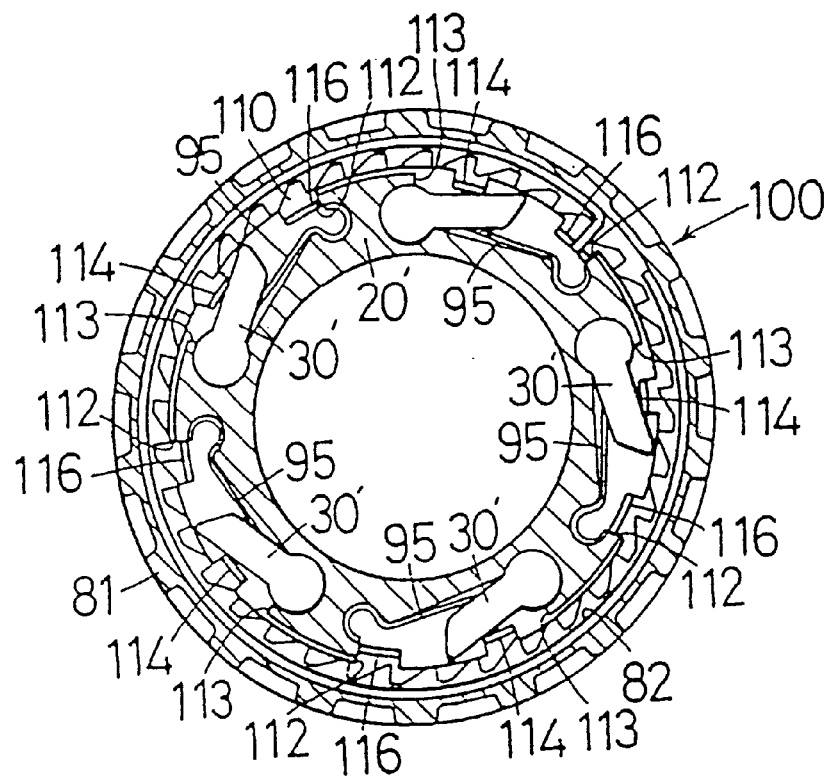
FIG. 7 is a view taken along line VII—VII in FIG. 6 showing the noise damping mechanism in an on state.
Figure 8:
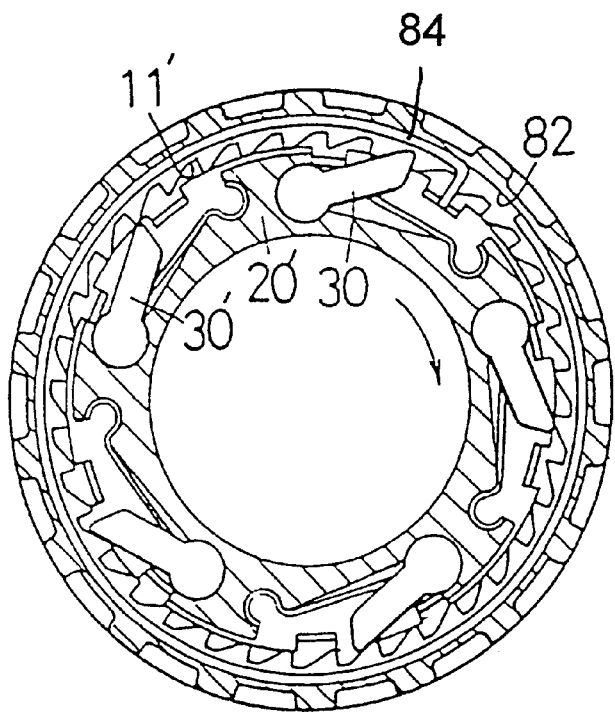
FIG. 8 is a view taken along line VII—VII in FIG. 6 showing the noise damping mechanism in an off state.

Although the ratchet mechanism 10 described in the embodiments shown in FIGS. 1–5 above was disposed in the interior opening of the outer ring 7, it is not always necessary to incorporate the ratchet mechanism 10 into the outer ring 7. When common sprockets are used, the diameter of the interior opening of the outer ring 7 is limited. More specifically, restrictions are imposed when enhancements are made to strengthen the pawls 30 of the ratchet mechanism 10, when the number of ratchet teeth 11 is increased and the tooth pitch is reduced, or the like. Accordingly, FIGS. 6 through 8 are views of a bicycle hub which incorporates an alternative embodiment of a ratchet mechanism including a noise-damping mechanism according to the present invention. This embodiment differs from the embodiment shown in FIGS. 1–5 in that the ratchet mechanism 10' is installed at the location of the right-side flange 5' of the hub shell 4'.

More specifically, the rear hub 1' is disposed about a horizontally extending hub axle 2'. A hub shell 4' is rotatably supported by means of a left ball bearing 3" and a right ball bearing 3' in such a way that rotation about the hub axle 2' is permitted. A left-side flange 5" and a right-side flange 5' are integrated into the hub shell 4'. The right-side flange 5' of the hub shell 4' in this embodiment is provided with a large-diameter annular component 75. An annular ratchet tooth main body 80 is linked via a conventionally structured serration 81 in the interior opening of the large-diameter annular component 75. The ratchet tooth main body 80 is thus fixed in the interior opening of the large-diameter annular component 75.

The ratchet tooth main body 80 is provided with ratchet teeth 11' of the same shape as the ratchet teeth 11 in the embodiment shown in FIGS. 1–5 above. A cage hole 82, which is the same groove as the cage hole 61 used in the previous embodiment, is formed in the peripheral surface of the inner peripheral hole of the ratchet tooth main body 80. A noise dampening mechanism 100 comprising a cage 110, a slide spring 84, and the like is positioned in this cage hole 82. The noise dampening mechanism 100 operates on virtually the same principle as in the first embodiment described above, so the detailed description will be omitted, and only the differences will be described.

The noise dampening mechanism 100 is fastened with the aid of a fastening ring 83, which is fixed to the interior opening of the large-diameter annular component 75, to prevent detachment in the axial direction of the hub axle 2. In addition, an inner cylinder 20' for swingably supporting the pawls 30' is positioned in the interior opening of the ratchet tooth main body 80. The pawls 30' are arranged along the outer periphery of the inner cylinder 20'. The pawls 30' shown in FIG. 7 are normally actuated by pawl springs 95 (plate springs) to ensure contact with the ratchet teeth 11'.

Cage stoppers 116 are integrated into the cage 110 of the pawl noise dampening mechanism 100. The cage stoppers 116 are held stationary by being pressed against the side surfaces 112 of the inner cylinder 20'. The cage 110 can move only within a fixed angular range. Pawl pressure components 114 apply pressure to the pawls 30', wherein the pawl pressure components 114 come into contact with the side surfaces 113 of the inner cylinder 20' when the freewheel is driven. The cage 110 is ultimately allowed to move in relation to the inner cylinder 20' only within a fixed angular range.

Support inside the interior opening of the inner cylinder 20' is provided by a roller bearing 85. The roller bearing 85 rotatably supports the inner cylinder 20' and a right-side hub shell 86 in relation to each other. One end of the right-side hub shell 86 is threadably fixed with a screw 87 to the interior opening of the hub shell 4'. The right-side hub shell 86 is therefore rotated integrally with the hub shell 4'. The right-side hub shell 86 is provided with a cylindrical extension 88.

An inner ring 90 of a ball bearing 89 is fitted around the outside of the extension 88, and an outer ring 91 of the ball bearing 89 is fitted inside the inner peripheral surface 92 of the interior opening of the outer ring 7'. On the other hand, the outer ring 7' is integrally fixed to one end of the inner cylinder 20' with a thread 93. The result is that the outer ring 7' is rotatably supported on the hub shell 4' with the aid of the roller bearing 85 and the ball bearing 89, and linkage is provided via the ratchet mechanism 10'.

A screw cup 40' is fixed to the extension 88 of the right-side hub shell 86. Because the screw cup 40' comprises a bearing 3, the hub shell 4' and the right-side hub shell 86 are rotatably supported on the hub axle 2' by the left bearing 3" and the right bearing 3'. The structures and functions of the pawl noise dampening mechanism 100 and the pawls 30' of the ratchet mechanism 10' are essentially the same as in the first embodiment described above, so their detailed description will therefore be omitted.

The advantages of this embodiment over the embodiment shown in FIGS. 1–5 is that the number of ratchet teeth 11 can be increased, the pawls and the ratchet teeth can be strengthened, and the like. Although a separate inner cylinder 20' was provided in the embodiment shown in FIGS. 6–8, it is also possible to extend the outer ring 7' all the way to the hub shell 4' to form an extension, and to position the pawls 30' in the extension.

While the above is a description of various embodiments of the present invention, further modifications may be employed without departing from the spirit and scope of the present invention. For example, there are 31 ratchet teeth 11 and five pawls 30 in the embodiment shown in FIGS. 1–5, and there are 36 ratchet teeth 11' and five pawls 30' in the embodiment shown in FIGS. 6–8. However, clearly neither the number of ratchet teeth 11 or 11' nor the number of pawls 30 or 30' is limited to these numerical values.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A ratchet mechanism for a bicycle hub comprising:
    a first hub member (20,20') having a first peripheral surface;
    a second hub member (7,75) having a second peripheral surface facing the first peripheral surface;
    wherein the first hub member (20,20') and the second hub member (7,75) are rotatable relative to each other;
    a plurality of pawls (30,30') supported by the first hub member (20,20');
    a plurality of ratchet teeth (11,11') supported by the second hub member (7,75);
    a biasing mechanism (23,95) for biasing the plurality of pawls (30,30') toward the plurality of ratchet teeth (11,11'); and
    a pawl control mechanism (60,100) disposed between the first peripheral surface and the second peripheral surface and responsive to relative rotation of the first hub member (20,20') and the second hub member (7,75) for allowing at least one of the plurality of pawls (30,30') to contact the plurality of ratchet teeth (11,11') when the first hub member (20,20') and the second hub member (7,75) rotate relative to each other in one direction and for preventing each the plurality of pawls (30,30') from contacting the plurality of ratchet teeth (11,11') when the first hub member (20,20') and the second hub member (7,75) rotate relative to each other in an opposite direction.

2. The ratchet mechanism according to claim 1 wherein the pawl control mechanism (60,100) comprises:
    a cage (62,110) having a pawls pressure component (64,114) for contacting the pawl (30,30'); and
    a clutch (70,84) coupled to the cage and to one of the first hub member (20,20') and second hub member (7,75) for causing the pawl pressure component (64,114) to retract the pawls (30,30') when the first hub member (20,20') and the second hub member (7,75) rotate relative to each other in the opposite direction.

3. The ratchet mechanism according to claim 2 wherein the first hub member (20,20') comprises an inner cylindrical member (20,20'), wherein the second hub member (7,75) comprises an outer cylindrical member (7,75) disposed coaxially with and radially outwardly of the first hub member (20,20'), wherein the pawls (30,30') are supported to an outer surface of the first hub member (20,20'), and wherein the ratchet tooth (11,11') is supported to an inner surface of the second hub member (7,75).

4. The ratchet mechanism according to claim 3 wherein the clutch (70,84) comprises a slide spring (70,84) having a portion coupled to the cage (62,114) and an outer peripheral surface in contact with the inner surface of the second hub member (7,75).

5. A bicycle hub comprising:
   a hub axle (2,2');
   a first hub member (20,20') coaxially and rotatably supported on the hub axle (2);
   a second hub member (7,75) coaxially and rotatably supported on the hub axle (2);
   wherein the first hub member (20,20') and the second hub member (7,75) are rotatable relative to each other;
   a plurality of pawls (30,30') supported by the first hub member (20,20');
   a plurality of ratchet teeth (11,11') supported by the second hub member (7,75);
   a biasing mechanism (23,95) for biasing the plurality of pawls (30,30') toward the plurality of ratchet teeth (11,11');
   a pawl control mechanism (60,100) responsive to relative rotation of the first hub member (20,20') and the second hub member (7,75) for allowing at least one of the plurality of pawls (30,30') to contact at least one of the plurality of the ratchet teeth (11,11') when the first hub member (20,20') and the second hub member (7,75) rotate relative to each other in one direction and for preventing each of the plurality of pawls (30,30') from contacting the plurality of ratchet teeth (11,11') when the first hub member (20,20') and the second hub member (7,75) rotate relative to each other in an opposite direction.

6. The bicycle hub according to claim 5 wherein the first hub member (20) comprises an inner cylindrical member (20), and wherein the second hub member (7) comprises an outer ring (7) coaxially supported radially outwardly of the inner cylinder (20).

7. The bicycle hub according to claim 6 further comprising a hub shell (4) coaxially and rotatably supported to the hub axle (2), wherein the first hub member (20) is coupled to the hub shell (4).

8. The bicycle hub according to claim 7 wherein the first hub member (20) is supported axially of the hub shell (4).

9. The bicycle hub according to claim 8 further comprising a body fixing bolt (56) for nonrotatably fixing the first hub member (20) to the hub shell (4).

10. The bicycle hub according to claim 6 wherein the plurality of pawls (30) are supported to an outer surface of the first hub member (20), and wherein the plurality of ratchet teeth (11) are supported to an inner surface of the second hub member (7).

11. The bicycle hub according to claim 10 wherein the pawl control mechanism (60) comprises:

an annular cage (62) having a plurality of pawl pressure components (64), wherein each pawl pressure component (64) is adapted to contact a corresponding pawl (30); and
a clutch (70) coupled to the cage (62) and to one of the first hub member (20) and second hub member (7) for causing the plurality of pawl pressure components (64) to retract their corresponding pawls (30) when the first hub member (20) and the second hub member (7) rotate relative to each other in the opposite direction.

12. The bicycle hub according to claim 11 wherein the clutch (70) comprises a circular slide spring having and end coupled to the cage (62) and an outer peripheral surface in contact with the inner surface of the second hub member (7).

13. The bicycle hub according to claim 5 wherein the first hub member (20') comprises an inner cylindrical member (20'), and further comprising a hub shell (4') coaxially and rotatably supported on the hub axle (2'), wherein the hub shell (4') includes an annular component (75) which forms the second hub member (75), and wherein the second hub member (75) is coaxially supported radially outwardly of the first hub member (20').

14. The bicycle hub according to claim 13 further comprising an outer ring (7') coaxially and rotatably supported to the hub axle (2'), wherein the first hub member (20') is coupled to the outer ring (7').

15. The bicycle hub according to claim 14 wherein the outer ring (7') extends axially from the first hub member (20').

16. The bicycle hub according to claim 13 wherein the plurality of pawls (30') are supported to an outer surface of the first hub member (20'), and wherein the plurality of ratchet teeth (11') are supported to an inner surface of the second hub member (75).

17. The bicycle hub according to claim 16 wherein the pawl control mechanism (100) comprises:
   an annular cage (110) having a plurality of pawl pressure components (114), wherein each pawl pressure component (114) is adapted to contact a corresponding pawl (30'); and
   a clutch (84) coupled to the cage (110) and to one of the first hub member (20') and second hub member (75) for causing the plurality of pawl pressure components (114) to retract their corresponding pawls (30') when the first hub member (20') and the second hub member (75) rotate relative to each other in the opposite direction.

18. The bicycle hub according to claim 17 wherein the clutch (84) comprises a circular slide spring (84) having and end coupled to the cage (110) and an outer peripheral surface in contact with the inner surface of the second hub member (75).

19. The bicycle hub according to claim 18 further comprising a fastening ring (83) for axially retaining the pawl control mechanism (100) to the second hub member (75).

* * * * *